United States Patent [19]
Appleton

[11] Patent Number: 5,644,694
[45] Date of Patent: Jul. 1, 1997

[54] APPARATUS AND METHOD FOR DIGITAL MOVIE PRODUCTION

[75] Inventor: William C. Appleton, Knoxville, Tenn.

[73] Assignee: Cyberflix Inc., Knoxville, Tenn.

[21] Appl. No.: 355,661

[22] Filed: Dec. 14, 1994

[51] Int. Cl.$^6$ ................................. G06T 13/00
[52] U.S. Cl. .................. 395/174; 395/956; 395/958; 395/959
[58] Field of Search ................. 395/152, 154, 395/118–139, 173–175, 949, 951, 956, 957, 958, 959; 345/122; 463/1, 30–34; 434/29–44; 348/121–124

[56] References Cited

U.S. PATENT DOCUMENTS

| | | |
|---|---|---|
| 4,475,132 | 10/1984 | Rodesch . |
| 4,752,836 | 6/1988 | Blanton et al. . |
| 4,766,541 | 8/1988 | Bleich et al. . |
| 4,797,836 | 1/1989 | Witek et al. ............... 395/152 |
| 4,807,158 | 2/1989 | Blanton . |
| 4,873,585 | 10/1989 | Blanton . |
| 4,890,833 | 1/1990 | Lantz et al. . |
| 5,093,907 | 3/1992 | Hwong ............... 395/960 X |
| 5,270,694 | 12/1993 | Naimark et al. ........... 345/123 |
| 5,404,316 | 4/1995 | Klingler et al. ........... 364/514 |
| 5,414,801 | 5/1995 | Smith et al. ............... 395/119 |
| 5,428,774 | 6/1995 | Takahashi et al. ........ 395/960 X |
| 5,479,597 | 12/1995 | Fellous ..................... 395/154 |
| 5,517,663 | 5/1996 | Kahn ........................ 395/800 |

OTHER PUBLICATIONS

Gervautz et al, "Integrating a Scripting Language into an Interactive Animation System", Computer Animation 1994 Proceedings, IEEE, pp. 156–166.

*Primary Examiner*—Joseph H. Feild
*Attorney, Agent, or Firm*—Luedeka, Neely & Graham, P.C.

[57] ABSTRACT

A method and apparatus for the production of digital movies of modeled elements within a virtual environment using a virtual camera which renders image frames. A mapper indicates those positions within the environment onto which the camera can and cannot go. A script writer determines the camera positions of the image frames needed for all the possible individual movies required to navigate the environment, and writes at least some of the positions into a script. A camera controller moves the camera to the positions called for in the script, operates the camera to render image frames, and names the image frames rendered by the camera. A movie builder builds at least some of the image frames rendered by the camera into individual movies, each movie having a predetermined series of image frames such that the sequential display of the series provides the illusion of motion. A movie unifier unifies all the individual movies into a single unified movie.

26 Claims, 9 Drawing Sheets

APPARATUS AND METHOD FOR DIGITAL MOVIE PRODUCTION

FIELD OF THE INVENTION

This invention relates to the field of digital movie production, and more particularly to the production of interactive, three dimensional, virtual environment digital movies.

BACKGROUND

As used herein, the term "movie" refers to both a series of image frames and their display, which gives the appearance of motion. Most image frames in the series are only slightly different from the image frames immediately preceding and succeeding them. Successively displaying the series of image frames in sequential order gives the appearance of motion.

There are two common methods of creating a digital movie. The first is to have an artist manually create each individual image frame required in the movie, using a process analogous to painting individual pictures. In order to make the movie interactive, the artist would need to create several different series of images, so that at different points during the display of the movie, the user could choose from among alternate subsequent series. The alternate sets of images would depict different action according to the choice that the user would input to the display apparatus.

While this technique allows for highly detailed, bit-mapped graphics to be incorporated into the image frames of the movie, the time required for an artist to individually create each image frame is cost prohibitive for all but very short digital movies.

Another method of creating a digital movie is to create a three dimensional virtual environment in a computer system. In the environment, series of mathematical equations represent the shapes and surfaces of all of the elements in the environment. The environment can be displayed by enabling a user to move a virtual camera through the environment in real time. This method generally provides more movement options to the user than does the hand drawn production technique.

However, this method requires enormous computing power if finely detailed elements of the environments are to be displayed. To reduce the computing requirements, surfaces of the elements are detailed with a process called texture mapping, which requires less data to be displayed, but does not provide as detailed a surface as bit-mapped graphics.

The present invention combines the benefit of the highly detailed, bit-mapped graphics of the manually produced digital movies, with the benefit of the versatility of the virtual environment produced digital movies, yet does not suffer from the associated drawbacks of requiring the labor intensity of individually drawing each image frame, or of reducing the detail of the image frames.

SUMMARY OF INVENTION

These problems, and others, are overcome in the various embodiments according to the present invention, in which is provided an apparatus implemented in a computer system having memory for the production of digital movies of modeled elements within a virtual environment using a virtual camera which renders image frames.

A mapper, responsive to user input commands, selects and indicates positions within the environment onto which the camera can and cannot go. Additionally the mapper sets some of the positions onto which the camera cannot go as being visually unique as to others of the positions onto which the camera cannot go, and also sets some of the positions onto which the camera cannot go as being visually identical to others of the positions onto which the camera cannot go.

A script writer determines the camera positions to be used for rendering the image frames needed for all the possible individual movies required to navigate the environment, and writes a script into memory containing at least some of the positions. A camera controller moves the camera to the positions written in the script, operates the camera to render image frames at the positions, and names and stores the image frames rendered by the camera.

A movie builder builds at least some of the image frames rendered by the camera into individual movies, each movie having a predetermined series of image frames such that the sequential display of the series provides the illusion of motion. A movie unifier unifies all the individual movies into a single unified movie.

In the preferred embodiment there is also an environment walker for displaying the unified movie, and a movie data stripper for breaking the unified movie back into individual movies. In the preferred embodiment the script writer determines all unique individual movies, writes a list of cross references of unique individual movies and possible individual movies, and only places the camera positions of the image frames needed for the unique individual movies in the script.

Also in the preferred embodiment, the script writer determines the camera positions of a plurality of image frames for each individual movie. The plurality of image frames comprise an image frame corresponding to a starting camera position within the environment, an image frame corresponding to an ending camera position within the environment, and image frames corresponding to intermediate camera positions between the starting and ending camera positions. The intermediate positions divide the distance between the starting and ending positions into equal steps.

In the preferred embodiment the movie builder builds the image frames rendered for each individual movie into a forward individual movie by arranging the image frames in sequential order, and also into a reverse individual movie by arranging the image frames in reverse sequential order. Alternately the movie builder builds the image frames rendered for each individual movie into a single individual movie, which is a forward movie when the image frames built therein are sequentially displayed in one direction, and is a reverse movie when the image frames built therein are sequentially displayed in the opposite direction.

BRIEF DESCRIPTION OF DRAWINGS

The present invention may best be understood by reference to a detailed description of preferred embodiments when considered in conjunction with the following drawings, in which.

DETAILED DESCRIPTION OF INVENTION

According to a preferred embodiment of the present invention, there is provided a method of creating interactive digital movies of three dimensional virtual reality environments, and an apparatus for the automated implementation of the method. A preferred embodiment of the source code used to construct the apparatus on a computer is contained in its entirety in the appendix.

While the preferred platforms for the apparatus of the present invention are Macintosh and Indigo computers, any other comparable platforms could be chosen for alternate embodiments. Also, in the preferred embodiment, some of the steps of the method, and some parts of the apparatus, are implemented on the Macintosh, while other steps and parts are implemented on the Indigo. This is to better take advantage of the strengths of each platform as they are presently constituted. There is no reason why the entire invention could not be built and accomplished solely on either one of the preferred platforms, or any other comparable platform.

The steps of the method include the following, which are defined and discussed in greater detail in the discussion below: map the environment, model the elements, place the elements in the environment, write the script, render the image frames, build the movies, unify the movies, walk the environment, and strip the movie data.

Of the above, all steps except for modelling the elements and placing the elements in the environment are implemented in the preferred apparatus. These two steps, modelling and placing, are common to the creation of environments, and in the preferred embodiment of the apparatus are accomplished using commercially available software as explained in more detail below, although in alternate embodiments functional elements facilitating these steps could be incorporated into the apparatus.

The steps may be performed in an alternate order to that given above. For example, the artist may model the elements before the environment is mapped, or concurrently with the mapping. Alternately, the steps of creating the three dimensional elements, and placing them within the environment, need not be performed until after the script is written.

Figure 1:
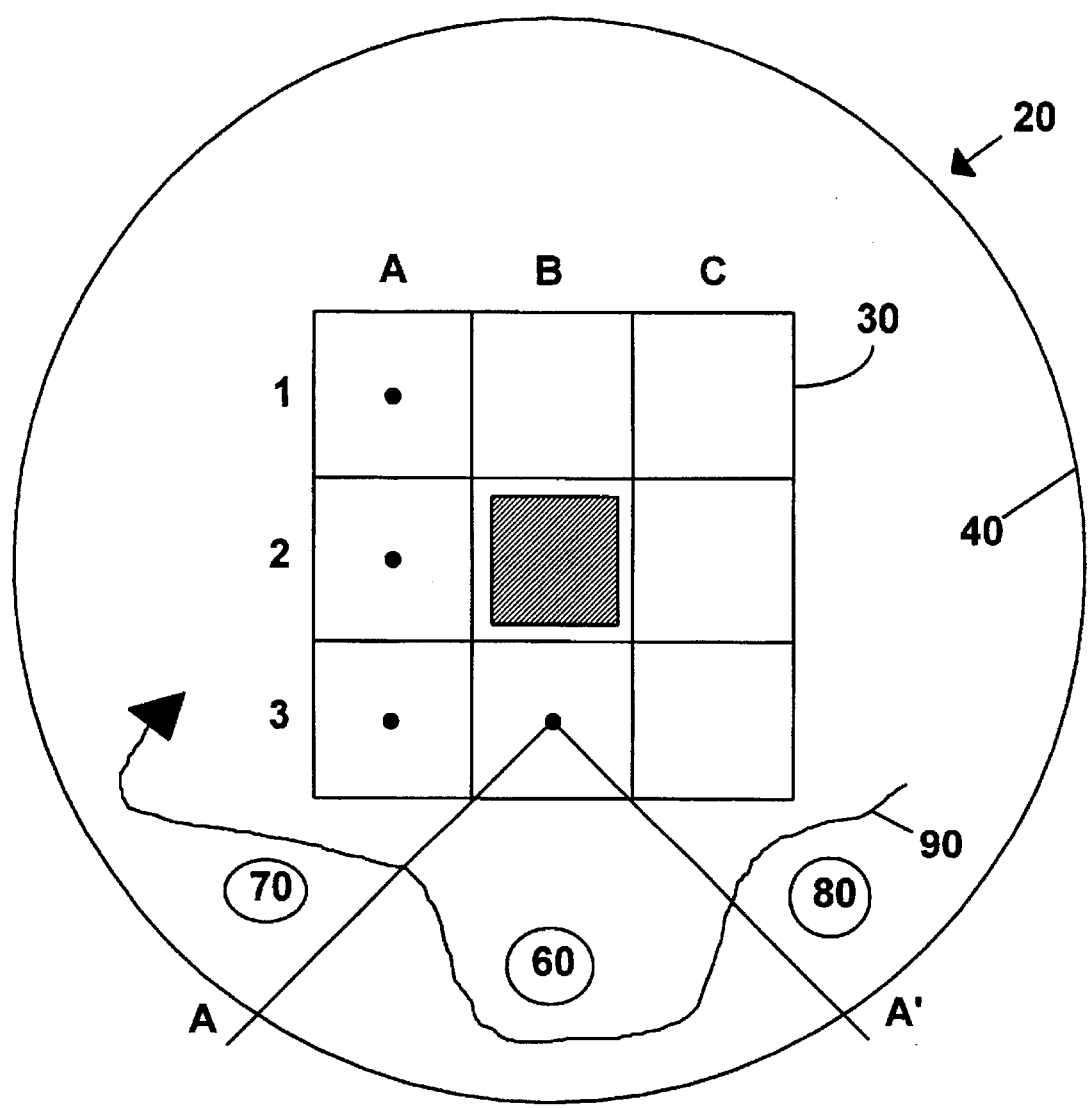
FIG. 1 depicts a three dimensional virtual environment.
Figure 1:
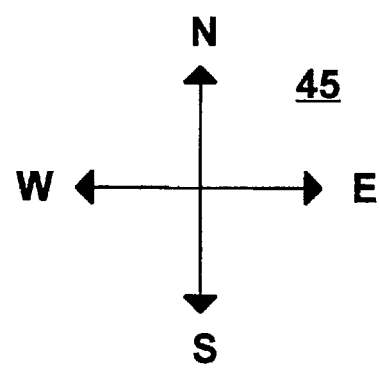

Referring now to the drawings in which like reference characters designate like or corresponding parts throughout the several views, there is shown in FIG. 1 a depiction of a three dimensional virtual reality environment 20. Within the environment 20 is a map 30. In a preferred embodiment, the circumferential boundary 40 of the environment 20 is a cylinder of sufficient diameter to enclose the map 30. If the environment 20 represents an outdoors scene, for example, a sky, horizon, and ground could be texture mapped or bit-mapped onto the boundary 40. While the map 30 in this example is laid out with rectangular coordinates, it will be appreciated that any system could be used to identify locations on the map 30, including a polar coordinate system, arbitrary reference numbers, or other indicia. In the preferred embodiment a rectangular coordinate system is used because it is widely recognized and quickly understood.

In the embodiment depicted in FIG. 1, a map 30 having three columns, labeled A through C, and three rows, labeled 1 through 3, has been mapped. Of course, the creation of a map 30 is not constrained to this specific number of rows and columns, and any number of each could be chosen. In a preferred embodiment there will typically be about twenty each of rows and columns, and the maximum will be limited only by the storage space available on the media chosen for the completed digital movie. Also in the preferred embodiment, the map 30 will be rectangular, but not necessarily square. Only three rows and columns have been depicted in FIG. 1 for ease of explanation.

There is also a directional compass inherently associated with the map 30, which is graphically represented here by compass 45. Thus in the preferred embodiment, the direction from row 3 towards row 1 is defined to be North, the opposite direction is South, the direction from column A towards column C is East, and the opposite direction is West. The choice of this particular directional system is purely arbitrary. The directional system is used to describe the movement from one location on the map 30 to another location on the map 30. Motion towards the East and South is defined to be in an increasingly positive direction along those axes, with an origin of (0,0) in the upper left hand corner of cell A1.

Certain of the cells on the map 30 defined by the rows and columns are empty, such as cell B1, and cell B2 has a hatched box within it. Cells A1, A2, A3, and B3 each have a dot within them, that is not a part of the preferred embodiment, but is useful for the explanation of processes described below. Those cells that are empty, or that have a dot within them, represent areas of the map 30 onto which movement is possible, and those cells that have a hatched box within them represent areas of the map 30 onto which movement is prohibited. In the preferred embodiment, no movement off of the map 30 is allowed.

Thus the length of open cells from A1 to A3 could represent a passageway in a cave, a hallway within a house, a road, or any other area where it is desired to allow movement. Similarly, cell B2 could represent a tree, the wall of a house, a pond, or any other area where it is desired to restrict movement.

It is not necessary that there be a "physical" impediment placed on a cell onto which movement is restricted. The modelled element eventually placed on the cell may be, for example, a fountain that does not use the entire space of the cell. Alternately, the element on that cell could extend into a cell onto which movement is allowed, but preferably not into an area of the cell that is traversed during a move, as discussed in more detail below.

A blank map 30 is first created by inputting to the apparatus, preferably implemented on the Macintosh computer, the desired number of rows and columns for the map 30. The apparatus responds by generating, in this example, a grid pattern representing the area of the environment 20 within which all interactive movement occurs. Next, the cells on which movement is restricted are inputted to the apparatus. In a preferred embodiment this is done by clicking with a mouse on the cell on which no movement is permitted, and the apparatus responds by displaying a box within the cell so designated.

Alternately, boxes could be dragged from one window, depicted on the display of the apparatus, to the cell on which movement is restricted in the map 30, depicted on the display in another window on the display. In a further embodiment, coordinates for the cell are inputted to the apparatus.

In the preferred embodiment, boxes of several different colors are available for placement on the map 30. The different colored boxes represent different modelled elements. For example, all green boxes could represent buildings that all look exactly the same. In actual use, the designer will only model a single building, represented by a green box in this example, and will then copy the same modelled building into each cell designated by a green box.

Similarly, all orange, yellow, and blue boxes could represent three other modelled elements that will be placed in multiple locations about the map 30 as designated by the location of the respective colored boxes. Alternately, one of the colors can represent elements that are always unique. For example, the color gray could be chosen as the "always unique" color, meaning that even though many cells on the map 30 may have gray boxes within them, none of the elements represented by the gray boxes will be identical to one another. In this manner an environment 20 with many unique elements will not require an inordinate number of different colored boxes to be depicted on the map 30. In an alternate embodiment the designer can designate to the apparatus that all boxes represent unique elements, regardless of the color of the box.

Figure 2:
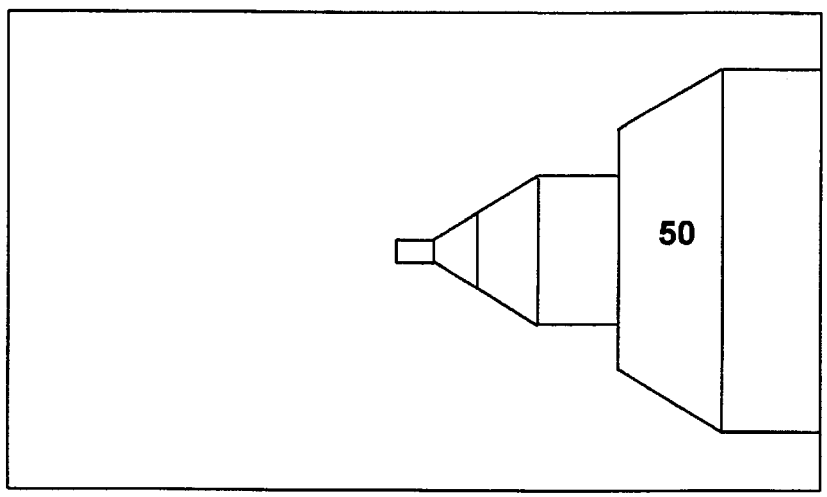
FIG. 2 is a perspective view from a position within a map.
Figure 3:
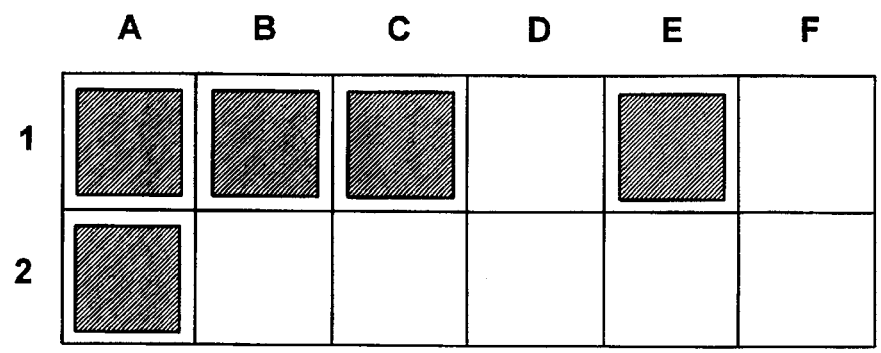
FIG. 3 depicts the map of the perspective views of FIGS. 2 and 4.

At any point during the creation of the map 30, a perspective view of the map 30 can be viewed. One such perspective view is depicted in FIG. 2. This view represents the map of FIG. 3 from the perspective of cell F2, facing West. The wall 50 represents the box in cell E1. This perspective image provides a simplified view of what the three dimensional environment 20 will look like.

Figure 4:
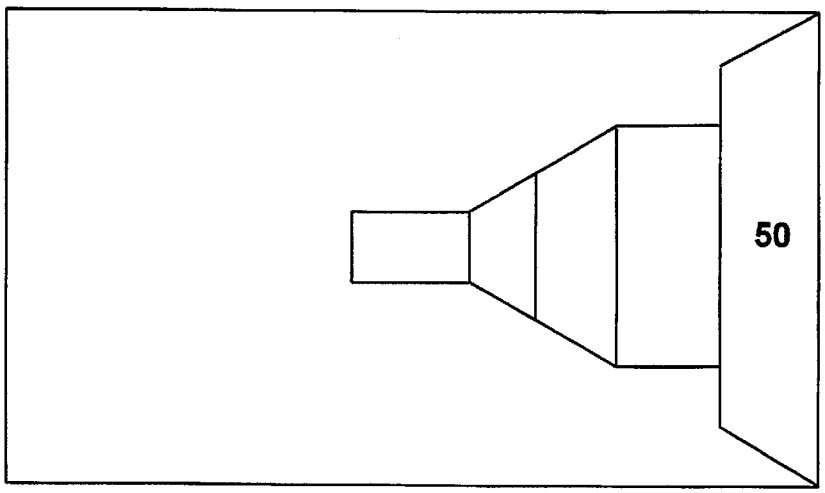
FIG. 4 is a perspective view from a position within the map adjacent to the position depicted in FIG. 2.

It is possible to move around inside of the map 30, while viewing the map 30 in the perspective view window. FIG. 4 shows the perspective view within the map 30 after moving from cell F2 to cell E2, still facing West. It can be seen that the wall 50 is now directly to the North of the current position, and the corridor just past wall 50, represented by cell D1, is closer to the position of the perspective view. In this manner the designer creating the environment 20 confirms that walls and passageways are placed in the appropriate positions.

In the preferred embodiment, the walls and passageways depicted in FIGS. 2 and 4 are not the ultimate expression of the environment 20, nor do they necessarily represent walls or passageways, but are instead merely a convenient metaphor for areas onto which movement is respectively prohibited or possible. When it is completed, the map 30, although depicted on the apparatus as described above, will actually be a table of locations, such as that embodied in Table 1, which represents a listing of the table as it may appear for the map 30 of FIG. 1. Each location entry in the table will have associated with it an indication of whether movement will be allowed onto the location or not.

Also associated with each location onto which movement will not be allowed will be an identifier, such as a box color, of the element that will eventually be placed in that location. As described above, some of the element identifiers may be identical to each other, and some may be unique, or alternately all may be unique, or all may be identical.

TABLE 1

| Location | Movement | Identifier |
|---|---|---|
| A1 | Yes | |
| A2 | Yes | |
| A3 | Yes | |
| B1 | Yes | |
| B2 | No | Brown |
| B3 | Yes | |
| C1 | Yes | |
| C2 | Yes | |
| C3 | Yes | |

When the map 30 for the environment 20 is complete, a script is written. A script is a document that lists, among other things, the image frames required by an interactive movie that will allow a user to navigate the environment 20. The image frames required are all those frames necessary to depict a translational move between each two cells of the map 30 that are adjacent at their sides, and full 360° rotational moves within each cell. Of course, this only refers to those cells onto which movement is allowed. The apparatus of the preferred embodiment writes the script automatically, and is preferably implemented on the Macintosh.

The apparatus writes the script by starting in the upper left-most cell of the map 30 on which movement is possible, and identifying all moves that are possible on or from that cell, both rotational and translational. As used herein, the term "move" will be understood to refer to both rotational moves and translational moves. To help explain the script, the map 30 depicted in FIG. 1 is used. The first cell on which movement is allowed is cell A1. The apparatus determines that in cell A1, starting with an orientation to the North, it is possible to rotate East, then South, then West, and then to the North again.

Next it is determined that from cell A1 facing East, it is possible to move onto cell B1. It is also determined that from cell A1 facing South, it is possible to move onto cell A2. In a like manner, every cell on the map 30 onto which movement is permissible will be investigated by the apparatus to determine all possible moves within the map 30. One embodiment of the set of all possible moves is shown in Table 2, and explained below. It will be appreciated that only forward translational moves, and clockwise rotational moves have been determined at this point. Counter-clockwise rotations and reverse translations will be dealt with more fully below.

TABLE 2

| Possible Moves | | | | |
|---|---|---|---|---|
| A1N–A1E | A2N–A1N | B1S–B1W | C1N–C1E | C2N–C1N |
| A1E–A1S | A2S–A3S | B1W–B1N | C1E–C1S | C2S–C3S |
| A1S–A1W | A3N–A3E | B1W–A1W | C1S–C1W | C3N–C3E |
| A1W–A1N | A3E–A3S | B1E–C1E | C1W–C1N | C2E–C3S |
| A1S–A2S | A3S–A3W | B3N–B3S | C1W–B1W | C3S–C3W |
| A1E–B1E | A3W–A3N | B3E–B3S | C1S–C2S | C3W–C3N |
| A2N–A2E | A3N–A2N | B3S–B3W | C2N–C2E | C3N–C2N |
| A2E–A2S | A3E–B3E | B3W–B3N | C2E–C2S | C3W–B3W |
| A2S–A2W | B1N–B1E | B3W–A3W | C2S–C2W | |
| A2W–A2N | B1E–B1S | B3E–C3E | C2W–C2N | |

To refer to a particular move, a special nomenclature is used in the script of the preferred embodiment. For example, a translational move from cell A1 to cell B1 is named A1E–B1E. The part of the translational move name, or in other words the movie name, before the hyphen refers to the starting cell of the move, and the direction of view for the starting image frame, which in this example is cell A1 facing East. The part of the name after the hyphen refers to the ending cell of the move, and the direction of view for the ending image frame, which in this example is cell B1 facing East.

After all of the possible moves within the map 30 of the environment 20 have been determined by the apparatus, each move is analyzed to see if it is identical to any of the other moves. By identical it is meant that the views at the starting positions for both moves are the same, and the views at the ending positions for both moves are also the same. This comparison process must take into account the uniqueness of different elements, which will eventually be placed in locations designated by the map 30, as represented by different colored boxes.

To make this determination, a check sum is mathematically tabulated for each of the starting position views, and each of the ending position views. If the two check sums for the two starting position views agree, and the two check sums for the two ending position views agree, and the motion, whether it be a translation or rotation, is the same, it is assumed that the moves are identical. If either of the comparisons of the two sets of check sums determines that the check sums do not agree, or if the motion is different, then the moves are not identical.

Preferably, each of the check sums used is calculated by adding the hexadecimal value of each pixel in the view, and using that value to compare to the commensurately determined value of other views, but other methods of check sum determination could be used in place of this method, as well as other comparison methods not involving check sums.

In a very large environment 20, where the elements situated on the cells on which movement is prohibited are quite uniform, or in other words mostly represented by non-unique boxes of the same color, there may be many moves within the map 30 that are identical. It would be redundant to create multiple, identical movies for these moves. Not only does this waste time during movie production, but storage of the duplicate movies would require space on the distribution media that could instead be used for other purposes, such as storage of movies needed for a larger environment 20.

Thus, the series of moves down a corridor defined on the left by a series of green boxes, and on the right by a series of red boxes, would not be identical to the series of moves down a corridor defined on the left by a series of yellow boxes, and on the right by a series of orange boxes. Even though the physical location of the elements may be similar between the two corridors, the elements represented by the colored boxes will not be identical.

In FIG. 1, there is only a single element in cell B2, and there are eight cells surrounding cell B2 onto which movement is permissible. The cells of this map 30 are arranged such that there is symmetry from right to left, and from top to bottom in the map 30. Thus, with forty-eight moves possible, there are only twelve unique moves throughout the map 30. These twelve moves are placed into the first list written into the script, as shown in Table 3.

TABLE 3

| Unique List | | | |
|---|---|---|---|
| A1N–A1E | A1W–A1N | A2N–A2E | A2W–A2N |
| A1E–A1S | A1S–A2S | A2E–A2S | A2N–A1N |
| A1S–A2W | A1E–B1E | A2S–A2W | A2S–A3S |

Using the list of unique moves, the set of all possible moves is updated to become a reference list, which is the second list written into the script. The reference list has all of the possible moves tabulated within it, just as depicted in the example of Table 2, but has appended to each entry within the list, one of the entries from the list of unique moves that is exactly the same as the move in the list of possible moves. For example, in the map 30 depicted in FIG. 1, the move A3W-A3N is exactly the same as the move A1N-A1E.

In considering if two moves are identical, the uniqueness of the sides of elements must be taken into consideration. For example, if two moves depicted translations towards two different green blocks, they may or may not be identical. If the moves both approach sides of each green block that are identical, or the moves approach the same side of each green block, then the moves would be identical.

But if one move approached a green block from the North, and the other move approached another green block from the South, and if the North and South faces of the element represented by green blocks were not identical, then those moves would likewise not be identical. Another factor to be considered in determining if two moves are identical, is the position of other elements within the field of view of the move, but not located on the map 30, such as 60, 70, and 80 which have not been considered in this discussion, but will be discussed in more detail below.

Each possible move is paired with a unique move by comparing the check sums of the starting and ending positions for the possible move to the corresponding check sums of each unique move. When a match is found, or in other words when the check sums are equal, the possible move is presumed to be identical to that unique move which had similar check sums.

An example of a reference list created from the set of all possible moves and the unique list is given in Table 4.

TABLE 4

| Reference List | | | | | | | | |
|---|---|---|---|---|---|---|---|---|
| Possible | | Unique | Possible | | Unique | Possible | | Unique |
| Move | | Move | Move | | Move | Move | | Move |
| A1N–A1E | = | A1N–A1E | A3N–A2N | = | A1E–B1E | C1S–C1W | = | A1E–A1S |
| A1E–A1S | = | A1E–A1S | A3E–B3E | = | A1S–A2S | C1W–C1N | = | A1S–A1W |

TABLE 4-continued

Reference List

| Possible Move | | Unique Move | Possible Move | | Unique Move | Possible Move | | Unique Move |
|---|---|---|---|---|---|---|---|---|
| A1S–A1W | = | A1S–A1W | B1N–B1E | = | A2W–A2N | C1W–B1W | = | A1S–A2S |
| A1W–A1N | = | A1W–A1N | B1E–B1S | = | A2N–A2E | C1S–C2S | = | A1E–B1E |
| A1S–A2S | = | A1S–A2S | B1S–B1W | = | A2E–A2S | C2N–C2E | = | A2S–A2W |
| A1E–B1E | = | A1E–B1E | B1W–B1N | = | A2S–A2W | C2E–C2S | = | A2W–A2N |
| A2N–A2E | = | A2N–A2E | B1W–A1W | = | A2S–A3S | C2S–C2W | = | A2N–A2E |
| A2E–A2S | = | A2E–A2S | B1E–C1E | = | A2N–A1N | C2W–C2N | = | A2E–A2S |
| A2S–A2W | = | A2S–A2W | B3N–B3E | = | A2E–A2S | C2N–C1N | = | A2S–A3S |
| A2W–A2N | = | A2W–A2N | B3E–B3S | = | A2S–A2W | C2S–C3S | = | A2N–A1N |
| A2N–A1N | = | A2N–A1N | B3S–B3W | = | A2W–A2N | C3N–C3E | = | A1S–A1W |
| A2S–A3S | = | A2S–A3S | B3W–B3N | = | A2N–A2E | C2E–C3S | = | A1W–A1N |
| A3N–A3E | = | A1E–A1S | B3W–A3W | = | A2N–A1N | C3S–C3W | = | A1N–A1E |
| A3E–A3S | = | A1S–A1W | B3E–C3E | = | A2S–A3S | C3W–C3N | = | A1E–A1S |
| A3S–A3W | = | A1W–A1N | C1N–C1E | = | A1W–A1N | C3N–C2N | = | A1S–A2S |
| A3W–A3N | = | A1N–A1E | C1E–C1S | = | A1N–A1E | C3W–B3W | = | A1E–B1E |

On the left of the equals sign of each entry in the list depicted in Table 4 are all the possible moves on the map 30, just as in Table 2. On the right of the equals sign is listed the unique move that can be used to depict each possible move. For example, the move A3S-A3W is identical to the move A1W-A1N. Thus a movie for the move A3S-A3W need not be created, because when the user wants to make the move A3S-A3W, the movie for the move A1W-A1N can be used.

In this manner a look-up table is provided, so that forty-eight possible moves can be represented by only twelve unique movies. This reduction in the number of movies which are required is a tremendous benefit in that less storage space is required to store just the unique movies, than would be required to store all of the forty-eight possible movies.

Figure 5:
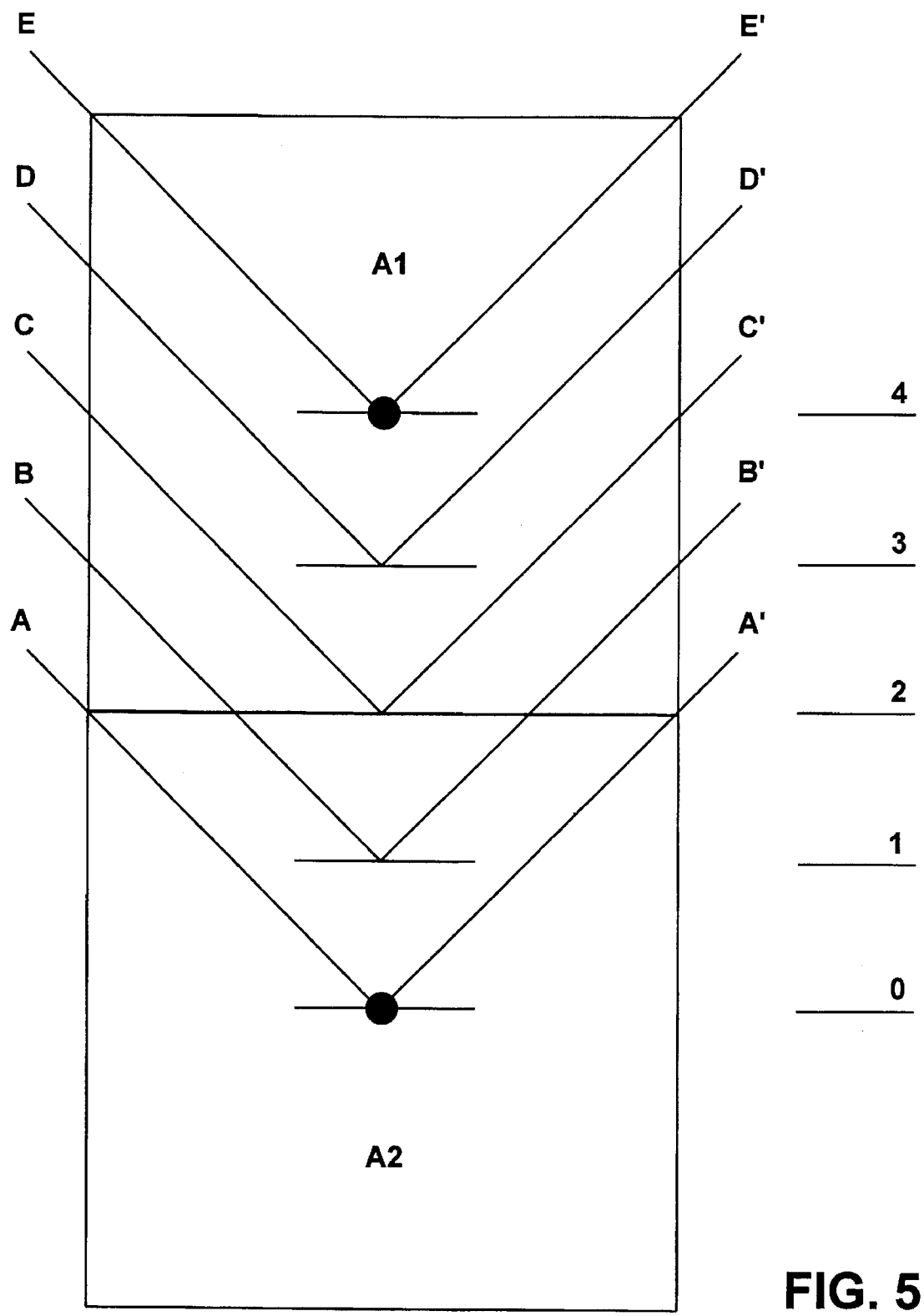
FIG. 5 depicts the camera positions and orientation for a translational move.

To avoid a jerky motion in the depiction of a translational move from one cell to an adjacent cell, and to provide a smooth illusion of motion, several intermediate views are required at positions between those depicted by the starting and ending vies of a move. While any number of intermediate positions, or steps, between the starting and ending views could be chosen, in the preferred embodiment there are four equal distance steps between two adjacent blocks, as depicted in FIG. 5.

Each of the four steps required to move from one cell to another is one-quarter of the total distance of the translation. The first view required is depicted as view A—A', which represents the view at the current, or starting cell position and orientation. View B—B' represents the position and orientation of the second view which is required to depict the translation. In a like manner, all of the other views represent incremental steps in the translation, ending with the view represented by view E—E'.

Thus it is seen that A2N-A1N, for example, actually requires a series of five views to depict the translation. Each view in the series is given a unique name, which in the preferred embodiment is the name of the move followed by a period and the number representing that view's position in the series. Thus the first view for the move A2N-A1N is A2N-A1N.1, representing view A—A' in FIG. 5, and the fifth view for the move is A2N-A1N.5, representing view E—E' in FIG. 5.

The name of each view required for each move in the unique list is compiled into a third and final list that is added to the script. Before the name of each of these required views, there is tabulated the positioning coordinates that will be passed on to the camera during the rendering portion of the method. A list of the views required, and the positions of the camera to be used during the rendering of each view, is listed for a single move, A2N-A1N, in Table 5.

TABLE 5

Camera Position and Orientation Coordinates for each View Required for a Single Move

| Camera Position | | | Point of Interest | | | View |
|---|---|---|---|---|---|---|
| X | Y | Z | X | Y | Z | Name |
| 128 | 72 | 384 | 128 | 72 | 256 | A2N–A1N.1 |
| 128 | 72 | 320 | 128 | 72 | 192 | A2N–A1N.2 |
| 128 | 72 | 256 | 128 | 72 | 128 | A2N–A1N.3 |
| 128 | 72 | 192 | 128 | 72 | 64 | A2N–A1N.4 |
| 128 | 72 | 128 | 128 | 72 | 0 | A2N–A1N.5 |

The first three columns contain camera coordinates that will be passed by the script to the rendering software. These coordinates are the actual positions of the camera on the map 30. The next three columns contain coordinates for the point of interest of the camera, or in other words, the position to which the camera is pointing, or the orientation of the camera. The last column contains the name to be associated with the view that will be rendered using the script parameters listed.

The two sets of coordinates in the script, camera position, and camera orientation, are listed in X, Y, and Z order. The X direction is along the East-West axis, with East being the increasingly positive direction. The Z direction is along the North-South axis, with South being the increasingly positive direction. Again, the upper left hand corner of cell A1 is defined to be the origin (0,0), and the coordinates grow positive in the South and East directions.

The Y direction is along a vector normal to the plane of the surface of the paper on which FIG. 1 is printed, recognizing that the environment 20 represented will be created in three dimensions on the apparatus. Movement along the Y axis in a direction increasingly above the sheet on which FIG. 1 is printed is defined to be positive. Each cell is defined to be 256 units in length along each axis.

Thus for the first view in Table 5, A2N-A1N.1, the camera will be located at 128, 72, 384, or at the center of cell A2 in the East-West direction (128), and at the center of cell A2 in the North-South direction (384, being the sum of all of cell A1 in the North-South direction, 256, plus half of cell A2 in the North-South direction, 128), and 72 units above the plane of the map 30. The camera will be pointed toward a spot in the environment 20 that is located half way across cell A2 in the East-West direction (128), all the way at the top of cell A2 in the North-South direction (256), and 72 units high. This will result in a view that is directly North from cell A2, and looking at a level angle, meaning looking neither up nor down.

This part of the script, containing the coordinates for the camera and the view names, is the part of the script that will be passed on to the rendering software in a later step of the method. The camera position and orientation coordinates, as well as the name of the view for the first and last move in the unique list of Table 3 is given in Table 6. The camera information for all of the other moves in the unique list would also be included in the list written into the script file in the preferred embodiment.

TABLE 6

| Camera Position | | | Point of Interest | | | View |
|---|---|---|---|---|---|---|
| X | Y | Z | X | Y | Z | Name |
| 128 | 72 | 256 | 128 | 72 | 0 | A1N–A1E.1 |
| 79 | 72 | 246 | 177 | 72 | 10 | A1N–A1E.2 |
| 37 | 72 | 219 | 219 | 72 | 37 | A1N–A1E.3 |
| 10 | 72 | 177 | 246 | 72 | 79 | A1N–A1E.4 |
| 0 | 72 | 128 | 256 | 72 | 128 | A1N–A1E.5 |
| . | | | . | | | |
| . | | | . | | | |
| 128 | 72 | 256 | 128 | 72 | 512 | A2S–A3S.1 |
| 128 | 72 | 320 | 128 | 72 | 576 | A2S–A3S.2 |
| 128 | 72 | 384 | 128 | 72 | 640 | A2S–A3S.3 |
| 128 | 72 | 448 | 128 | 72 | 704 | A2S–A3S.4 |
| 128 | 72 | 512 | 128 | 72 | 768 | A2S–A3S.5 |

Figure 6:
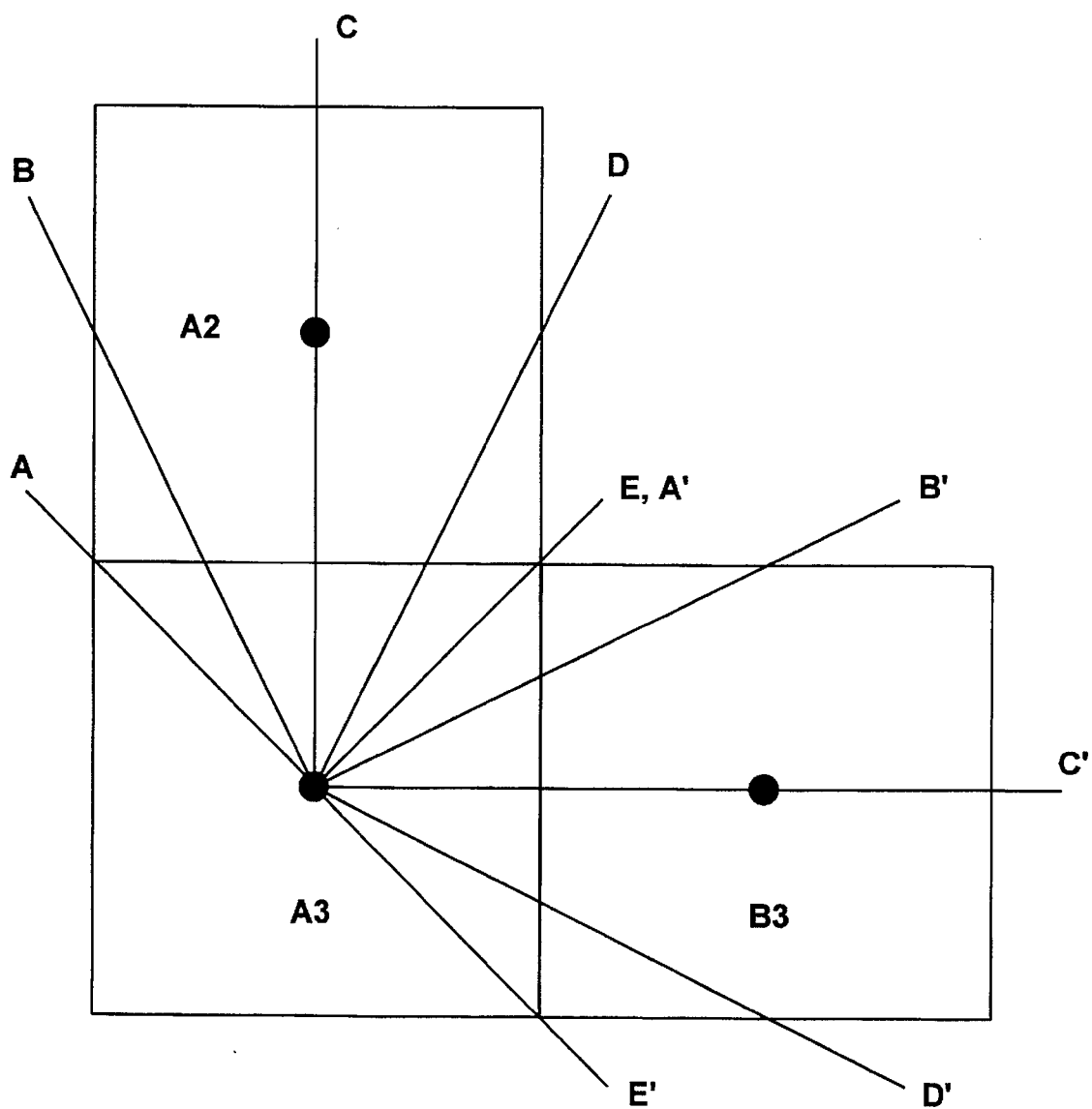
FIG. 6 depicts the camera position and orientations for a rotational move.

There is depicted in FIG. 6 the views that are required to depict a rotational move. Again, it is desired that some number of intermediate views be used so as to provide a more fluid movement between the starting and ending image views. As in the example of the translational movement, in the preferred embodiment four equal distance steps are used between the starting and ending views.

Once again, it is not essential to the invention that the number of intervening steps be four, or that the number of steps for a translational move equal the number of steps for a rotational move. As can be seen, in the preferred embodiment, the axis of rotation for each cell is located at the center of the cell, but there is no reason why, in alternate embodiments, the axis could not be chosen as any other location within the cell.

Figure 7:
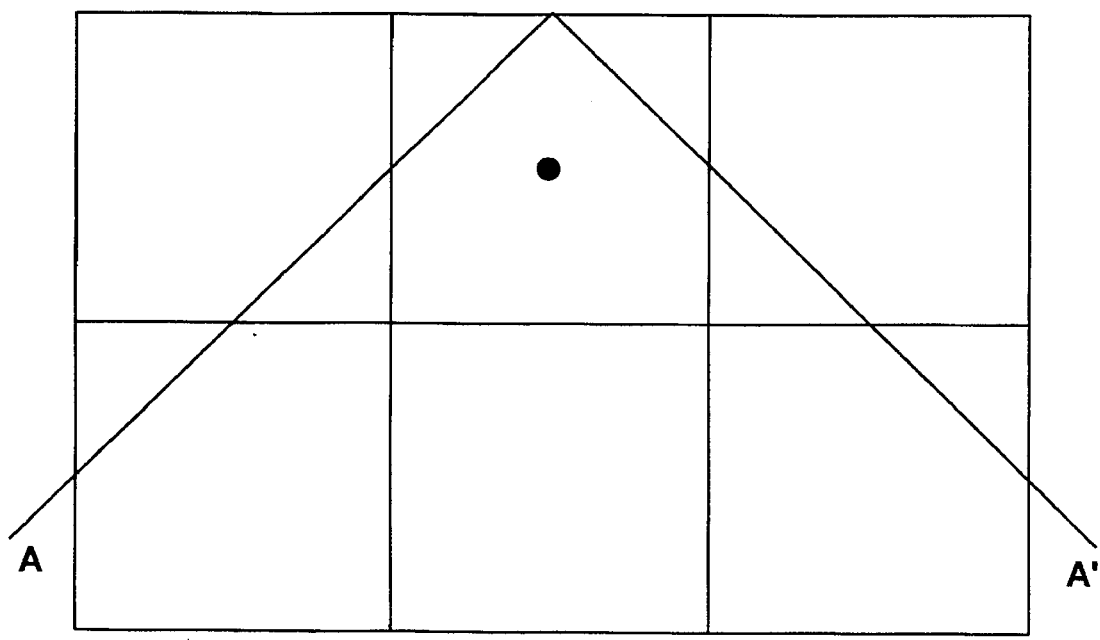
FIG. 7 depicts the field of view of an image frame rendered from a set-back camera position.
Figure 8A:
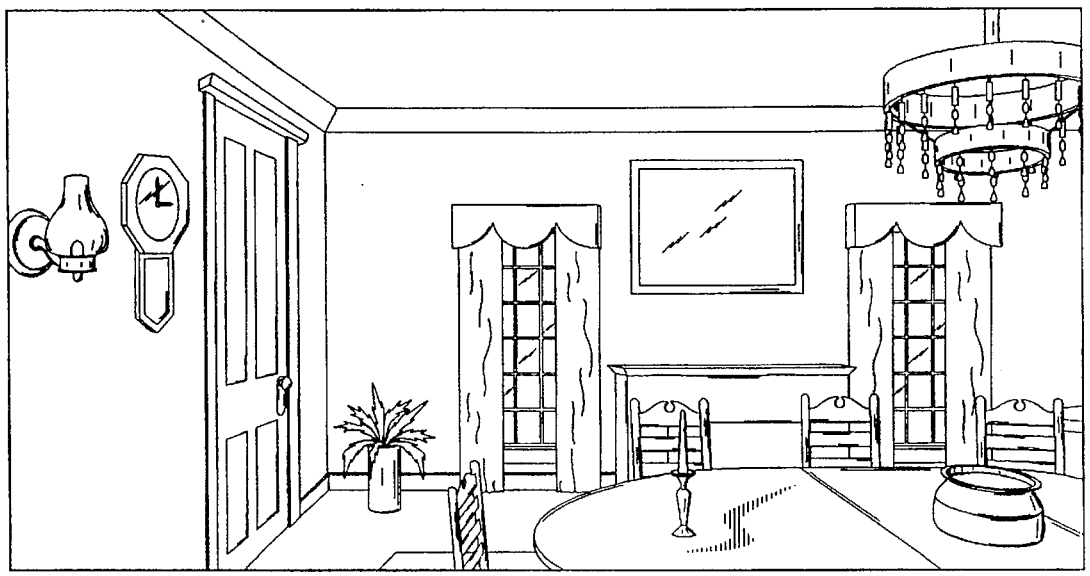
FIGS. 8A–8E are a sequence of image frames depicting a rotational move.
Figure 8B:
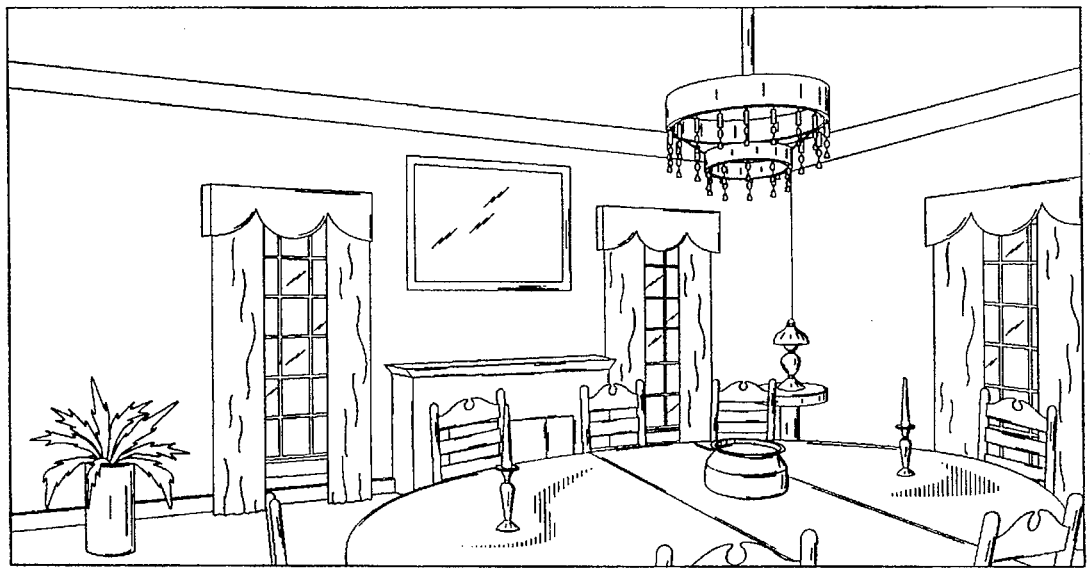
Figure 8C:
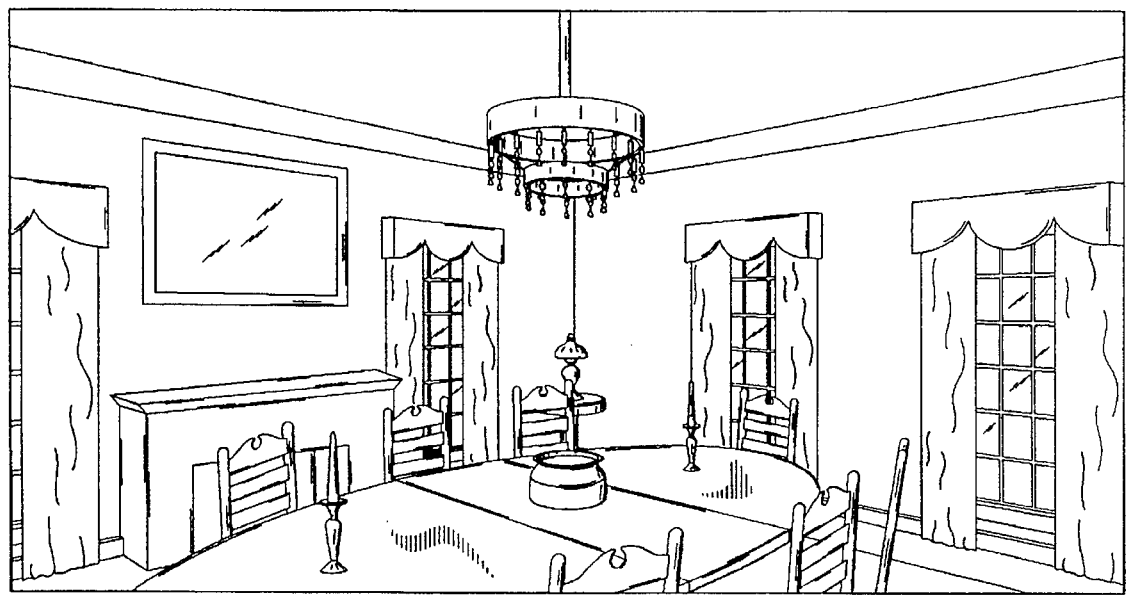
Figure 8D:
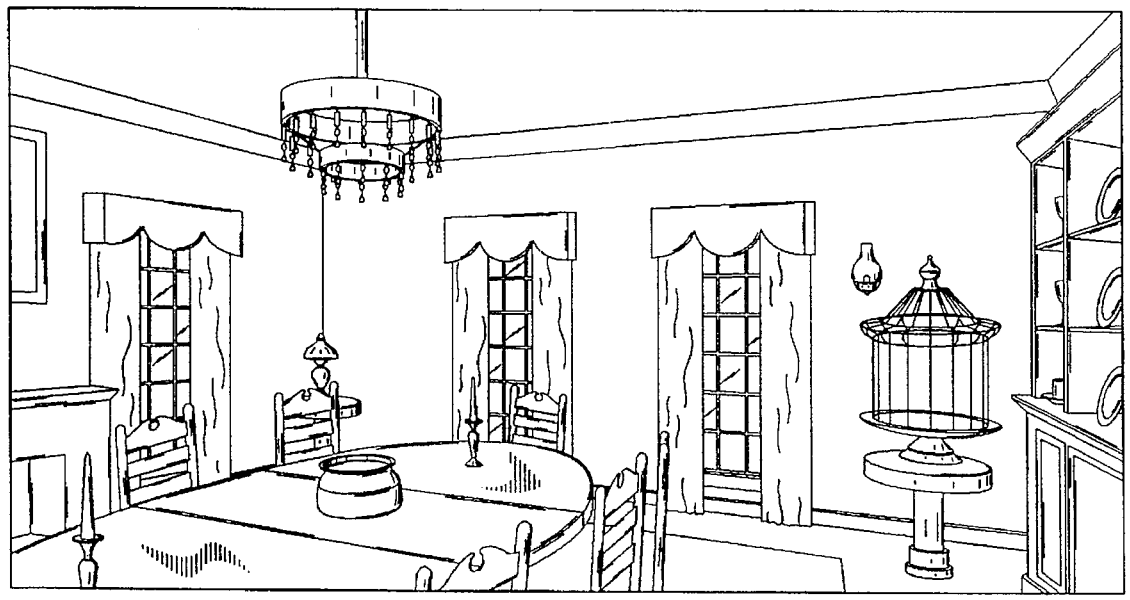
Figure 8E:
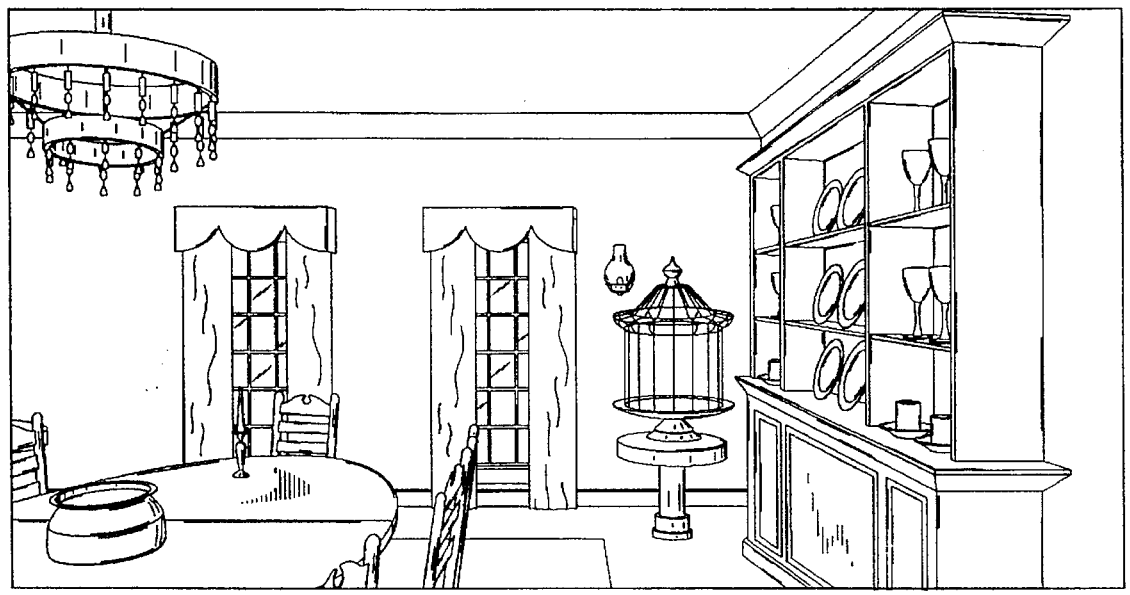

Also, the position for the camera, when rendering a view, need not be the center of a cell. In the preferred embodiment, the camera is set back from the center of the cell, as depicted in FIG. 7. Thus a portion of the cells on either side of the cell in which the camera is located are visible in view A—A'.

In the example depicted in FIG. 6, the move is A3N-A3E. It is seen that the camera position is the same for the starting and ending views, but the orientation between the two views changes from North to East. Thus in the first view, the view is from cell A3 North into cell A2, and in the last view called for by the script entry, the view is from cell A3 East into cell B3.

Each of the four steps required to rotate from a perspective view along one axis to a perspective view along another axis is one-quarter of the total distance of the rotation. The first view required is depicted as view A—A', which represents the view at the current, or starting cell position and orientation. View B—B' represents the new orientation of the second view which is required to depict the rotation.

In a like manner, all of the other views represent incremental steps in the rotation, ending with the view represented by view E—E'. Thus it is seen that A3N-A3E actually requires a series of five views to depict the rotation. The image frames for a rotational move are named, for example, A3N-A3E.1 through A3N-A3E.5, according to the convention described above for the views of translational moves.

In the preferred embodiment, the final expression of the script file will be the unique list of Table 3, followed by the reference list of Table 4, followed by the complete coordinate list of Table 6. The script file is saved as an ASCII text file in the preferred embodiment.

It will be appreciated that at this point only clockwise rotations and forward translations have been determined. These moves are called forward moves. The reason for this is that in the preferred embodiment these are the only moves for which investigation is required to determine unique moves, and for which views need to be rendered. Counterclockwise rotations, such as A1E-A1N, and reverse translations, such as A1N-A2N, are called reverse moves. The treatment of reverse moves will be covered in greater detail below.

The next step of the preferred embodiment is to render the different views of the environment as they have been determined and listed in the script. When the camera renders a view, an image frame is created. Thus it is said that in this step, the image frames are rendered, or in other words created. An image frame contains the data necessary to depict a single view of the environment from a position and orientation as determined in the script.

In the preferred embodiment, before the camera renders image frames of the environment 20, the individual elements of the environment 20 are created by an artist. This is done in the preferred embodiment on the Indigo with modelling software external to the apparatus of the invention, such as Soft Image, Alias, or Wave Front. In alternate embodiments the apparatus includes the ability to model and render. The elements of the environment 20 are not two dimensional, but are virtual three dimensional models. If, for example, the environment 20 represents a street scene with buildings along the street, one element of the environment 20 may be a single building.

In the preferred embodiment, the building of the previous example will have as many detailed sides as are visible from the cells within the map 30 on which movement is allowed. Thus if the building has other buildings adjacent to it on either side, neither side of the building needs to be modeled in great detail. The front of the building, however, can have as great a level of detail as allowed by the modeling software used.

In the preferred embodiment, artists model every visible face of every element within the environment 20. While it may be desired to make each element within the environment 20 unique, it is possible to reuse the same modeled element in different parts of the environment 20. Once all of the elements have been modeled, they are placed within the environment 20, on locations previously determined on the map 30, which in this depiction is cell B2, and in other predetermined locations within the environment 20.

Additional elements 60, 70, and 80 can be placed outside of the map 30, within the environment 20 as seen in FIG. 1.

While programmed movement of elements can occur in the area between the map 30 and the boundary 40, along path 90 for example, no user controllable interaction is possible in this area, in a digital movie produced by the apparatus of the preferred embodiment, because the camera is not allowed to move off of the map 30. However, the camera can move to a cell on the edge of the map 30, such as B3, and with a South facing orientation, view whatever elements may be visible between that position and the boundary 40, as represented by view A—A'.

After the modeled elements are placed in the environment 20, the environment 20 is complete, and ready for the camera to render the image frames called for in the script. Thus, in a preferred embodiment of an apparatus implemented on the Indigo according to the present invention, for every unique translation and rotation in the script, the camera renders five image frames, being one image frame for each view. A series of five image frames depicting a rotational move are depicted in FIGS. 8A through 8E.

The control software that automatically positions the camera of the rendering software, as directed by the script, is a part of the apparatus of the present invention, as is the apparatus that automatically names each rendered image frame in a systematic manner according to the script entry which called for the image frame. That is, for script entry A1N-A1E.1, the name of the image frame is A1N-A1E.1. These modules of the apparatus are also implemented on the Indigo.

During the rendering process, only the final list in the script, depicted in Table 6, is used, being the list of camera positions, orientations, and view names, or in other words image frame names. For example, the first entry in this list is used to position the camera to 128, 72, 256 within the environment, and point the camera to 128, 72, 0. An image frame is rendered by the camera, and stored under the name A1N-A1E.1. Then the camera control software of the present invention repositions the camera to the position and orientation listed for image frame A1N-A1E.2, renders the image frame, and stores it under that name.

This process is repeated until every line of this list of the script has been processed. When completed, as per this example, there will be sixty image frames rendered, named, and stored, representing five image frames for each of the twelve unique moves.

The next step of the method, performed in a preferred embodiment of an apparatus according to the present invention, is to compress the image frames and associated data into movies, and is preferably implemented on the Macintosh. As discusses above, five image frames are required for each translational move, and for each rotational move. Since it is desired to allow for subsequent interaction with the environment 20, such as determining which direction to turn, or which cell to move onto next, the five image frames required for each type of move, and the data associated with them, are placed in a single movie file structure.

Figure 9:
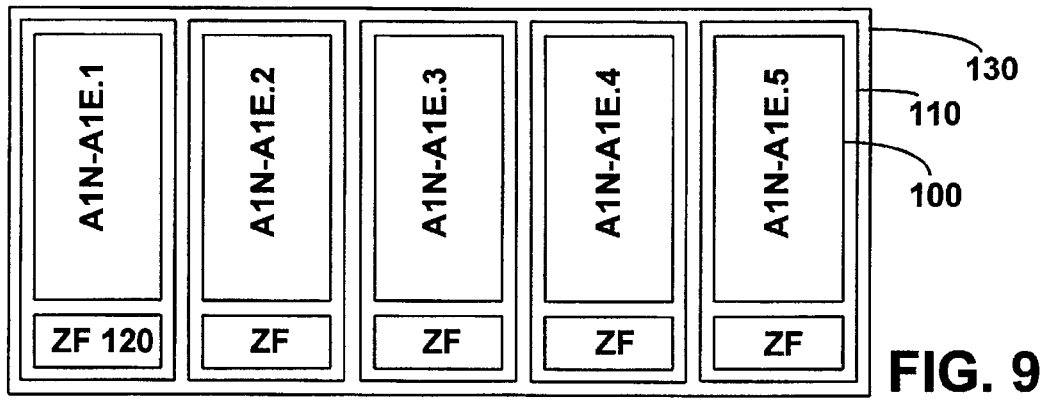
FIG. 9 is a representation of an individual movie file.

One embodiment of an individual movie file is depicted in FIG. 9. The image frames 100 are associated with other data into a single movie frame 110. In the preferred embodiment this other data may be a z frame 120 of depth values associated with the image frame 100. Each of the five movie frames 110 for a single translation or rotation are then associated into an individual movie file 130. Thus there will be many movie files 130, each containing the image frames 100 and other data necessary to depict a single fluid translation or rotation. In the preferred embodiment, all of the information contained in each movie file 130 is compressed before being incorporated into the movie file 130.

For example, the individual movie 130 could be the movie for the move A1N-A1E. Therefore, the image frames 100 for move A1N-A1E would be A1N-A1E.1 through A1N-A1E.5, which in the preferred embodiment would be arranged in sequential order.

While only image frames 100 for unique movies are scripted, and subsequently rendered by the camera, these image frames 100 are used, in the preferred embodiment, in more than one movie 130. For example, the image frames 100 depicting the rotation A1N-A1E are compiled in the order described above for the forward movie file 130 of that designation, and are also compiled in reverse order into another movie file 130 to depict the reverse rotation A1E-A1N. Thus both clockwise and counter-clockwise rotations are compiled from the same set of image frames 100.

While in the preferred embodiment both forward and reverse movies 130 are compiled and stored, in alternate embodiments only the forward movie 130 is compiled and stored. When the reverse movie 130 is required, the forward movie 130 is loaded and presented to the display in reverse order. However, in the preferred embodiment, in the example given, there will be twelve unique forward movies 130 built, and twelve unique reverse movies 130 built. Again, the term "movies" is defined to encompass both rotational movies and translational movies 130.

During the individual movie file 130 building process, the first list of the script, the unique list shown in Table 3, is used as a check list to ensure that all of the image frames 100 required for each movie file 130 have been rendered. Also at this time, in the preferred embodiment, the image frames 100 are checked for data integrity, to ensure that they are not corrupted in any way. Of course, in the preferred embodiment, both a forward and reverse movie 130 will be required for each entry in the unique list.

The next step of the preferred method, performed by the apparatus as implemented on the Macintosh, is unifying the individual movie files 130. In this step all of the movie files 130 created are brought into a single unified movie structure 140 depicted in FIG. 10. As each individual movie file 130 is brought into the unified movie 140, the script is used to ensure that every movie file 130 required has been rendered and built. If any movie files 130 are missing, the apparatus alerts the designer to the condition, and indicates which movie files 130 are still needed.

The individual movie files 130 are unified into a single file 140 so that the movies 130 can be read from the distribution media faster. This is made possible by circumventing the normal operating system data access routines, and supplying, in the preferred embodiment, data access routines that are optimized to the data structure of the unified movie file 140. By means of providing a unified file 140 and optimized data access routines, the time required to access individual image frames 100 is reduced, and thus the latency between the display of successive image frames 100 is commensurately reduced, and the illusion of motion is enhanced.

Another benefit of unifying the individual movie files 130 into a single file 140 is that more movies 130 can be placed into a given amount of storage space on the distribution media. This is possible because there is a certain amount of file overhead required on the media for each file thereon, regardless of the size of the file. Thus thousands of small, individual movie files 130 will consume more storage space than will a single, large, unified file 140.

Yet another benefit of the unified movie structure 140 is the control which it gives over elimination of seek time when accessing the storage media. For example, all individual movies 130 depicting a forward translation along a lengthy corridor can be placed one after another within the unified movie 140. In this manner, the device which reads the individual movies 130 from the media need only position the data reading apparatus a single time, or in other words, need only seek the proper data location once, and may then consecutively read data from off of the storage media.

This is an important aspect of the unified movie 140 because multiple seeks would interrupt the speedy delivery of images to the display device, and detract from the appearance of smooth motion. To this end, sequences of individual movies 130 depicting translations along a single axis are placed in order one after another within the unified movie file 140. Similarly, a series of clockwise rotations about a single axis are place one after another, and series of counter-clockwise rotations are also grouped in this manner. Such groups of individual movie files 130 depicting translations and rotations that are located near one another within the environment 20 are placed so as to be likewise near one another within the unified movie file 140 on the storage media, so that the seek time, and number of seeks, between closely associated individual movie files 130 is reduced.

Also associated with the unified movie file 140 is an index 150, which in alternate embodiments may either be incorporated directly into the unified movie file 140, or is external to the unified movie file 140.

In the preferred embodiment, the second list in the script, the reference list depicted in Table 4, is used as the starting point for the creation of the index 150. To the reference list is added what could be termed a mirror image of each entry. This creates for each forward move listed in the reference list, the associated reverse move. Thus for A1N-A1E there will be created an entry for A1E-A1N. In this way every possible reverse translation and counter-clockwise rotation will have a listing in the index 150, along with the unique reverse move that can be used to depict each possible reverse move. It will be remembered that the reverse movies 130 have already been created using copies of the same image frames 100 used to build the forward movies 130.

Therefore, instead of only forty-eight entries in the index 150, like there are in the reference list depicted in Table 4, the index 150 will have ninety-six entries, forty-eight of which will represent forward moves, and forty-eight of which will represent reverse moves. And these ninety-six moves will be indexed to twenty-four unique moves, constituting twelve unique forward moves, and twelve unique reverse moves. To each entry in the index 150 will be added information representing the physical location on the storage media of the movie file 130 which represents that entry.

For example, if the user issued a command that required the movie 130 B3S-B3W to be played, the index 150 would be consulted by the system to determine the location of the individual movie file 130 to be played. Looking in Table 4, it can be seen that B3S-B3W is not a unique movie 130, but is referenced to A2W-A2N. Associated with this entry in the index 150 of the preferred embodiment would be a location description for the physical position of the movie 130 A2W-A2N. Thus it would not matter to the system that B3S-B3W is not a unique movie 130, as it would simply jump to the position indicated in the index 150, and read the movie file 130 found at that location.

By way of further example, if the user issued a command that required the movie 130 A2S-A3S, the index 150 would again be consulted to determine the location of the individual movie file 130 to be played. Looking in Table 4, it can be seen that A2S-A3S is a unique movie, but again this makes no difference to the system, as it will merely read the location description associated with that index 150 entry, and again jump to the position so indicated, and read the movie file 130 found at that location.

Thus it can be seen that when the unified movie 140 is complete, it makes no difference that only the unique movies 130 are present in the unified movie 140, as all of the logic required to represent all of the possible moves using only the unique moves is contained in the index 150.

At this point in the method the production of the digital movie 140 is complete, as it has been assembled into a structure which, if free of data errors, is ready for distribution. However, the method and apparatus of the present invention go beyond this point, and provide debugging tools to ensure that the interactive nature of the virtual reality movie 140 is error free.

Thus the next step of the method implemented in the apparatus is walking the environment 20, and is preferably implemented on the Macintosh. This functionality gives the designer the opportunity to move through the environment 20 and visually check any details desired, to ensure that every aspect of the environment 20 performs as designed. Should something be amiss in the movie 140, the next step of the method implemented in the apparatus on the Macintosh, strip movie data, is used to break out all of the individual movie files 130 in the unified file 140 into a condition in which they existed before they were unified.

At this point other movies 130 can be inserted, removed, repaired, or replaced, all according to the desires of the designer. When the appropriate changes are completed, the movie files 130 are once again unified, and the environment 20 of the unified movie 140 can again be walked. When all aspects of the environment 20 conform to the designer's desires, the digital movie 140 is ready for distribution.

The digital movie 140 contains all of the individual movie files 130 needed to move around the environment 20. In the preferred embodiment this includes all forward and reverse unique translations and rotations. However, in alternate embodiments, as has been previously mentioned, reverse moves are depicted by displaying the forward moves in reverse sequential order.

On each cell in which movement is permitted, the user can choose to rotate 360° in either direction, in 90° increments, to view all that is around the cell, and can also move from that cell to any adjacent cell onto which movement is permitted, by stepping either forward or backward. Thus, by issuing commands to a movie playing apparatus, which in the preferred embodiment is accomplished by using the arrow keys on a standard computer keyboard, the user is able to move about the environment 20 as desired, with each step that is taken being represented by a movie 130 which provides the illusion of motion from one position to another.

Figure 10:
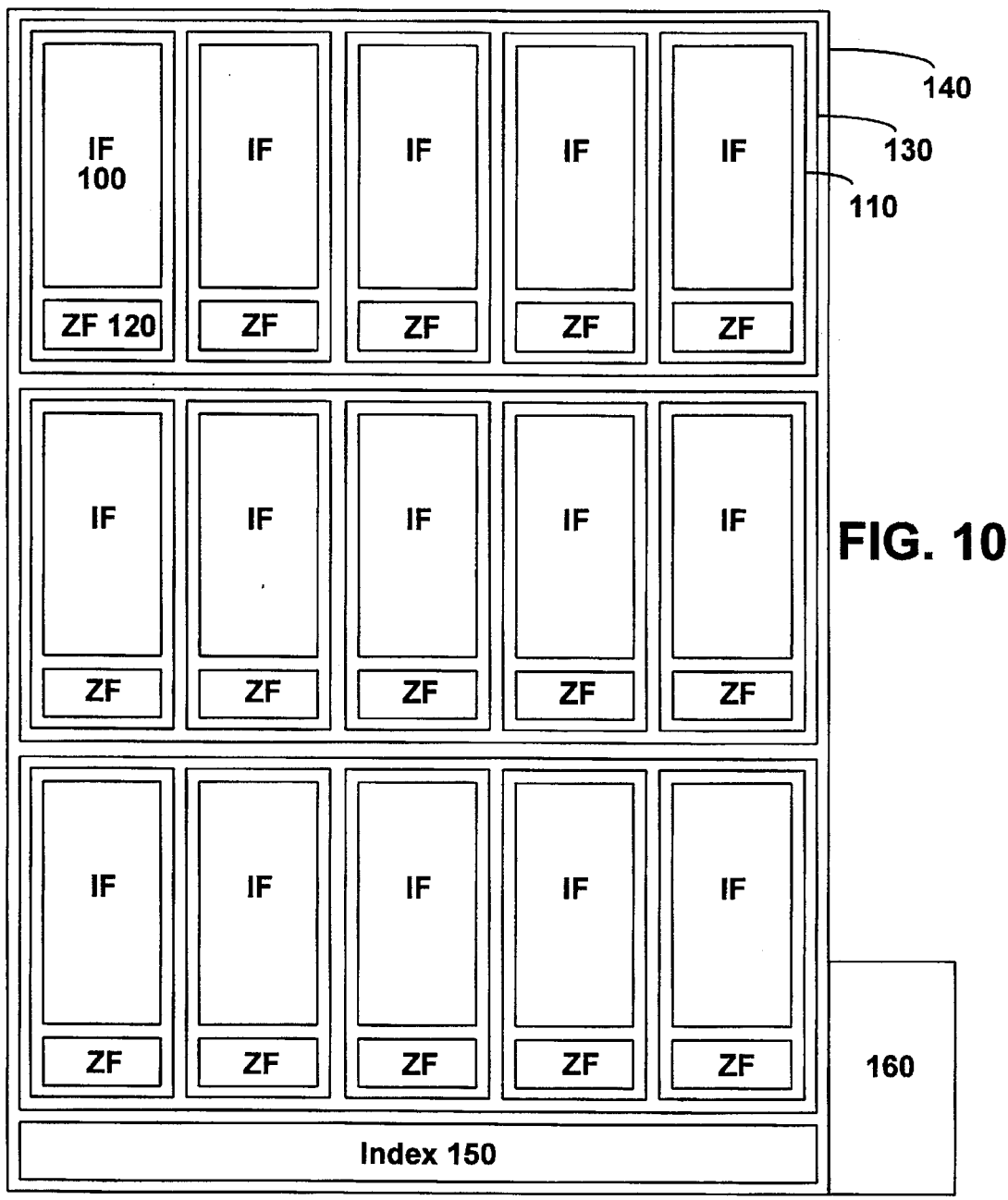
FIG. 10 is a representation of a unified movie file with control code.

This requires the addition of control code 160 to the unified movie 140 and index 150 depicted in FIG. 10. The control code 160 intercepts keystrokes input by the user, and interprets the keystrokes into the motion desired by the user. The control code 160 then identifies the movie 130 that must be played in order to provide the motion called for by the user.

For example, if the current view depicted is B1E, and the user pressed the down arrow key on the keyboard, the control code 160 would intercept the keystroke, and interpret the command to indicate that the user desired to make a reverse translation, or in other words move backwards. The movie 130 representing the reverse translation from the position and orientation of B1E is B1E-A1E, the entry for which would be found in the index 150. From there the control code 160 would jump to the position on the storage media indicated for that movie 130 entry, and load and display the movie 130, as has been described above.

To extend the example, if the user next pressed the right arrow key on the keyboard, the control code 160 would intercept the keystroke, and interpret the command to indicate that the user desired to make a clockwise rotation. The movie 130 representing the clockwise rotation from the new position and orientation just moved to, A1E, is A1E-A1S. The control code would find the entry for this movie 130 in the index 150, jump to the storage media position indicated in that entry, and load and display the movie 130 found there, as previously described.

The control code 160 consults the index 150 to determine the location of the desired movie 130 in the unified movie 140, and presents the image frames 100 of the movie 130 sequentially to a display. If the user presses a key representing movement onto a cell into which no movement is permitted, the control code 160, in one embodiment, does not alter the continued display of the last image frame 100 shown.

It will be appreciated that only a very simple embodiment of the present invention has been described herein. For example, only a single element has been placed on a map that is represented by a nine cell grid. In more elaborate embodiments there would be many elements on the map, which would not necessarily be laid out in a grid pattern. Also, in the examples given, all rotations constituted 90° turns. In alternate embodiments, turns could be 1°, 45°, or 120°, according to the desires of the designer. In further embodiments, turns could be interrupted part way through the rotation, and then played in reverse, returning to the starting field of view.

While preferred embodiments of the present invention have been described above, it will be appreciated by those of ordinary skill in the art that the invention is capable of numerous modifications, rearrangements and substitutions of parts without departing from the spirit of the invention.

What is claimed is:

1. An apparatus implemented in a computer system having memory for the production of digital movies of modeled elements within a virtual environment using a virtual camera which renders image frames, comprising:

a mapper responsive to user input commands, for selecting and indicating positions within the environment onto which the camera can and cannot go; and a script writer for determining camera positions to be used for rendering the image frames needed for individual movies of the environment, and for writing a script into the memory containing at least some of the positions.

2. The apparatus of claim 1 wherein the mapper further comprises means for setting some of the positions onto which the camera cannot go as being visually unique, and for setting some of the positions onto which the camera cannot go as being visually identical to others of the positions onto which the camera cannot go.

3. The apparatus of claim 1 wherein the script writer further comprises means for determining camera positions to be used for rendering the image frames needed for all the possible individual movies required to navigate the environment.

4. The apparatus of claim 1 wherein the script writer further determines all unique individual movies, writes a list of cross references of unique individual movies and possible individual movies, and places only the camera positions of the image frames needed for the unique individual movies in the script.

5. The apparatus of claim 1 wherein the script writer determines the camera positions of a plurality of image frames for each individual movie, the plurality of image frames further comprising an image frame corresponding to a starting camera position within the environment, an image frame corresponding to an ending camera position within the environment, and image frames corresponding to intermediate camera positions between the starting and ending camera positions.

6. The apparatus of claim 1 further comprising:

a camera controller for moving the camera to the positions written in the script, for operating the camera to render image frames at the positions, and for naming and storing the image frames rendered by the camera; and a movie builder for building at least some of the image frames rendered by the camera into individual movies, each movie having a predetermined series of image frames such that the sequential display of the series provides the illusion of motion.

7. The apparatus of claim 6 wherein the movie builder builds the image frames rendered for each individual movie into a forward individual movie by arranging the image frames in sequential order, and into a reverse individual movie by arranging the image frames in reverse sequential order.

8. The apparatus of claim 6 wherein the movie builder builds the image frames rendered for each individual movie into a single individual movie which further comprises a forward movie when the image frames built therein are sequentially displayed in one direction, and a reverse movie when the image frames built therein are sequentially displayed in the opposite direction.

9. The apparatus of claim 6 further comprising a movie unifier for unifying at least some of the individual movies into a single unified movie.

10. The apparatus of claim 9 further comprising an environment walker for displaying the unified movie.

11. The apparatus of claim 9 further comprising a movie data stripper for breaking the unified movie back into individual movies.

12. An apparatus implemented in a computer system having memory for the production of digital movies of modeled elements within a virtual environment using a virtual camera which renders image frames, comprising:

a mapper responsive to user input commands, for selecting and indicating positions within the environment onto which the camera can and cannot go, for setting some of the positions onto which the camera cannot go as being visually unique, and for setting some of the positions onto which the camera cannot go as being visually identical to others of the positions onto which the camera cannot go;

a script writer for determining camera positions to be used for rendering the image frames needed for all the possible individual movies required to navigate the environment, determining all unique individual movies, writing a list of cross references of unique individual movies and possible individual movies, and writing a script into the memory containing only the camera positions of the image frames needed for the unique individual movies;

a camera controller for moving the camera to the positions written in the script, for operating the camera to render image frames at the positions, and for naming and storing the image frames rendered by the camera;

a movie builder for building at least some of the image frames rendered by the camera into individual movies, each movie having a predetermined series of image frames such that the sequential display of the series provides the illusion of motion;

a movie unifier for unifying at least some of the individual movies into a single unified movie; and an indexer for creating an index of the unified movie, the index having a list of the possible movies cross referenced with the location of the unique movies which can be played to depict the possible movies.

13. A method for the production of digital movies of modeled elements within a virtual environment using a virtual camera which renders image frames, comprising:

mapping the environment to indicate those positions within the environment onto which the camera can and cannot go;

setting some of the positions onto which the camera cannot go as being visually unique;

setting some of the positions onto which the camera cannot go as being visually identical to others of the positions onto which the camera cannot go; and writing a script of camera positions used for rendering image frames needed for all the possible individual movies required to navigate the environment.

14. The method of claim 13 further comprising:

moving the camera to the positions written in the script;

operating the camera to render image frames at the positions;

naming and storing the image frames rendered by the camera; and building at least some of the image frames rendered by the camera into individual movies, each movie having a predetermined series of image frames such that the sequential display of the series provides the illusion of motion.

15. The method of claim 14 further comprising unifying at least some of the individual movies into a single unified movie.

16. The method of claim 14 further comprising walking the unified movie to discover errors.

17. The method of claim 14 further comprising stripping the movie data to break the unified movie back into individual movies.

18. The method of claim 14 wherein the step of building the individual movies further comprises building the image frames rendered for each individual movie into a single individual movie which is a forward movie when the image frames built therein are sequentially displayed in one direction, and a reverse movie when the image frames built therein are sequentially displayed in the opposite direction.

19. The method of claim 14 wherein the step of building the individual movies further comprises building the image frames rendered for each individual movie into a forward individual movie by arranging the image frames in sequential order, and into a reverse individual movie by arranging the image frames in reverse sequential order.

20. The method of claim 13 wherein the step of writing the script further comprises determining all unique individual movies, writing a list of cross references of unique individual movies and possible individual movies, and placing only the camera positions of the image frames needed for the unique individual movies in the script.

21. The method of claim 13 wherein the step of writing the script further comprises determining the camera positions of a plurality of image frames for each individual movie, the plurality of image frames having an image frame corresponding to a starting camera position within the environment, an image frame corresponding to an ending camera position within the environment, and image frames corresponding to intermediate camera positions between the starting and ending camera positions.

22. A method for the production of digital movies of modeled elements within a virtual environment using a virtual camera which renders image frames, comprising:

mapping the environment to indicate those positions within the environment onto which the camera can and cannot go;

setting some of the positions onto which the camera cannot go as being visually unique;

setting some of the positions onto which the camera cannot go as being visually identical to others of the positions onto which the camera cannot go;

determining camera positions to be used for rendering image frames needed for all the possible individual movies required to navigate the environment;

determining all unique individual movies;

writing a list of cross references of unique individual movies and possible individual movies;

writing a script containing only the camera positions of the image frames needed for the unique individual movies;

moving the camera to the positions written in the script;

operating the camera to render image frames at the positions;

naming and storing the image frames rendered by the camera;

building at least some of the image frames rendered by the camera into individual movies, each movie having a predetermined series of image frames such that the sequential display of the series provides the illusion of motion;

unifying at least some of the individual movies into a single unified movie; and indexing the unified movie to create an index having a list of the possible movies cross referenced with the location of the unique movies which can be played to depict the possible movies.

23. An interactive movie of a virtual environment, contained within a unitary data structure, and stored on a computer readable medium, comprising:

an index cross-referencing a list of possible moves within the environment with a list of unique moves within the environment;

each unique move on the list in the index having associated with it a unique movie file;

each unique move on the list in the index having associated with it the location within the movie of the unique one of the movie files;

each movie file having at least one movie frame;

each movie frame having at least an image frame; and each image frame rendered from a position within the environment.

24. The interactive movie of claim 23 further comprising control code for accepting user input commands, interpreting the commands, and displaying the movie files based on the commands input.

25. In an interactive movie in which the operator inputs commands to cause desired moves within a displayed environment, the improvement comprising:

a unified movie file including a plurality of individual movies stored at locations within the unified movie, the individual movies collectively representing all of the possible moves within the interactive movie;

an index that cross references every possible move with a unique move in the interactive movie at a location in the unified movie file;

control means for receiving and interpreting the commands from the operator corresponding to a desired move within the displayed environment, for using the index to determine the location within the unified movie file of an individual movie corresponding to the desired move, and for displaying the individual movie corresponding to the desired move.

26. A method of displaying an interactive movie of a virtual environment comprising:

accepting a user input command from a user interface device;

interpreting the command as an indication to perform an action selected from the list comprising making no change in the display of the movie, displaying a clockwise turn, displaying a counterclockwise turn, displaying a forward translation, and displaying a reverse translation;

determining a movie designation based upon the interpretation of the command and the present display position;

finding the movie designation in an index of all possible movie designations;

finding by cross-reference the name of a unique movie that can be used to depict the action associated with the movie designation;

determining the location of the unique movie within a storage media; and displaying the unique movie on a display.

* * * * *